(12) United States Patent
Ikeda

(10) Patent No.: US 6,538,683 B2
(45) Date of Patent: *Mar. 25, 2003

(54) IMAGE FORMING APPARATUS AND A CONTROL METHOD OF AN IMAGE FORMING APPARATUS

(75) Inventor: Yuichi Ikeda, Numazu (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/426,879

(22) Filed: Oct. 26, 1999

(65) Prior Publication Data

US 2002/0054204 A1 May 9, 2002

(30) Foreign Application Priority Data

Oct. 26, 1998 (JP) .............................. 10-304564

(51) Int. Cl.[7] .............................. B41J 2/47; B41J 2/385
(52) U.S. Cl. ........................................ 347/252; 347/133
(58) Field of Search ................................ 347/133, 252; 358/298; 399/49, 60, 72, 127, 128

(56) References Cited

U.S. PATENT DOCUMENTS

| 4,709,250 A | | 11/1987 | Takeuchi |
| 4,819,066 A | | 4/1989 | Miyagi |
| 4,847,695 A | * | 7/1989 | Arai ....................... 358/298 X |
| 4,864,419 A | * | 9/1989 | Saito et al. ............. 358/298 X |
| 4,914,459 A | * | 4/1990 | Mama et al. ................ 347/133 |
| 5,309,177 A | | 5/1994 | Shoji et al. |
| 5,467,195 A | | 11/1995 | Mizoguchi .................. 358/296 |
| 5,579,090 A | | 11/1996 | Sasanuma et al. .......... 355/208 |
| 5,608,495 A | * | 3/1997 | Kitakubo et al. ............. 399/72 |
| 5,859,933 A | | 1/1999 | Sasanuma et al. .......... 382/275 |

FOREIGN PATENT DOCUMENTS

JP 63-214449 9/1988

* cited by examiner

Primary Examiner—Judy Nguyen
(74) Attorney, Agent, or Firm—Fitzpatrick, Cella, Harper & Scinto

(57) ABSTRACT

An object of the present invention is to solve a problem in which in an image forming apparatus which performs pulse width modulation, when the maximum pulse width is changed to change the maximum density, the exposure amount in patch formation also changes to make it difficult to accurately control the patch and maintain gradation characteristics. To achieve this object, the maximum pulse width of pulse width modulation can be changed. It is determined whether a patch is to be formed. For normal image formation, the maximum pulse width is set to a changed value. For patch formation, the maximum pulse width is set at a predetermined value, and an image is formed.

10 Claims, 16 Drawing Sheets

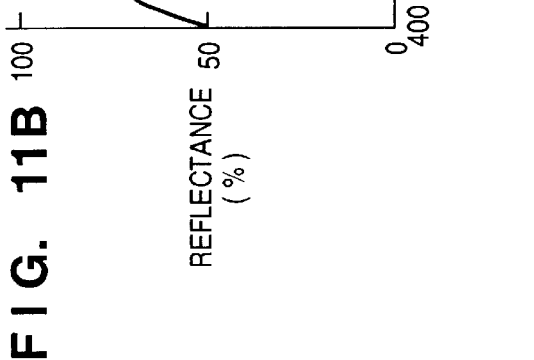
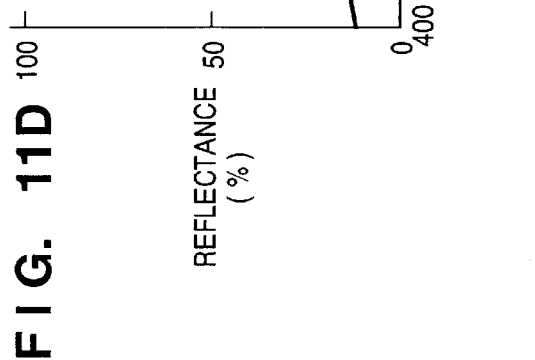
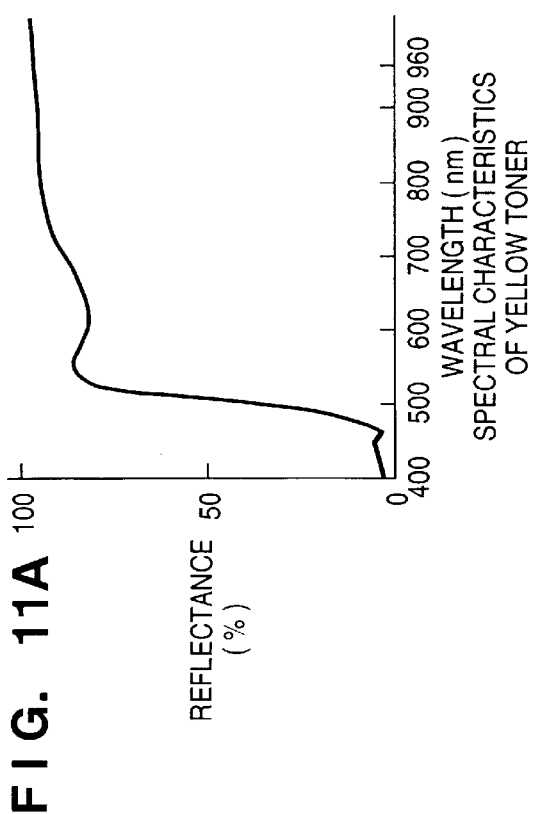
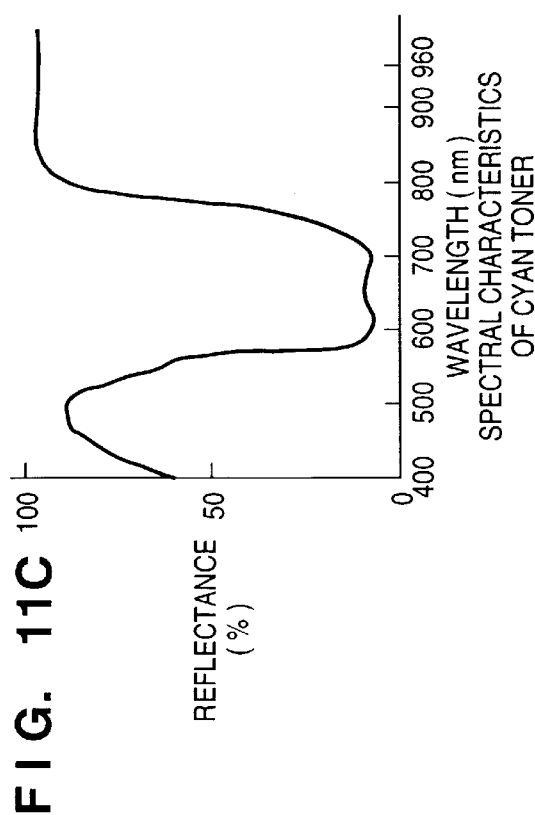

IMAGE FORMING APPARATUS AND A CONTROL METHOD OF AN IMAGE FORMING APPARATUS

BACKGROUND OF THE INVENTION

1. Field of the Invention

The present invention relates to an image forming apparatus and a control method of an image forming apparatus and, more particularly, to an image forming apparatus for forming an image by electrophotography and a control method of the image forming apparatus.

2. Description of the Related Art

Conventionally, for a so-called electrophotographic image forming apparatus which forms an electrostatic latent image on an image carrier by laser exposure, develops the latent image using developing agents including toners of predetermined colors, and transfers the image to a printing medium to form a visible image, a pulse width modulation (PWM) technology is known, in which gradation can be accurately expressed by modulating the pulse width of a laser beam in accordance with an image signal.

In the image forming apparatus using PWM, a patch based on a predetermined exposure amount is formed on the image carrier. On the basis of the measurement value of the patch density, the mixing ratio (T/C ratio) of two components (toners and carriers) the developing agents or the contrast potential for developing is controlled, thereby maintaining given gradation characteristics of the apparatus.

On the other hand, the maximum density in image formation can be controlled by changing the maximum pulse width in PWM.

However, if a maximum pulse width Pff of the laser beam is changed to change the maximum density of an image and the exposure amount in forming a patch changes accordingly, accurate patch control (calibration using a patch) would be difficult, and given gradation characteristics cannot be maintained.

For example, when the maximum pulse width Pff is increased to increase the maximum density, the exposure amount of a patch portion also increases to result in a high density measurement value of the formed patch. In gradation control based on patch density, for example, the T/C ratio is reduced to maintain a predetermined patch density. More specifically, although the maximum pulse width Pff is increased to increase the entire image formation density, the T/C ratio is reduced, i.e., inverse correction is done. This may pose a fatal problem such as carrier adhesion in the printing medium. In contrast potential control based on patch density as well, inverse correction is performed: although the density need be made high, a contrast potential Vcont is reduced.

When the maximum pulse width Pff is decreased to lower the maximum density, inverse correction is performed such that the T/C ratio is increased. This poses a problem of toner scattering or fog.

SUMMARY OF THE INVENTION

The present invention has been made to solve the above-described problem, and has its object to provide an image forming apparatus capable of maintaining stable gradation characteristics even when the maximum pulse width is changed in image formation by pulse width modulation of a laser beam, and a control method of the image forming apparatus.

In order to achieve the above object, the image forming apparatus according to the present invention has the following arrangement.

According to the present invention, there is provided an image forming apparatus characterized by comprising modulation means for pulse-width-modulating an image signal to output a pulse width modulation signal, setting means for setting a maximum pulse width of the image signal in the modulation means, formation means for exposing and developing an image on an image carrier on the basis of the pulse width modulation signal to form a visible image, generation means for generating a predetermined pattern using the formation means, correction means for correcting an image formation condition on the basis of the density of the generated predetermined pattern, and control means for controlling, in forming the predetermined pattern, to obtain a predetermined exposure amount on the image carrier independently of the maximum pulse width set by the setting means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 11A to 11D are graphs showing the spectral characteristics of color toners;

DETAILED DESCRIPTION OF THE PREFERRED EMBODIMENTS

The embodiments of the present invention will be described below in detail with reference to the accompanying drawings.

Preferred embodiments of the present invention will be described in detail below.

First Embodiment

Apparatus Arrangement

The overall arrangement of an electrophotographic digital copying machine according to the first embodiment will be described first.

Figure 1:
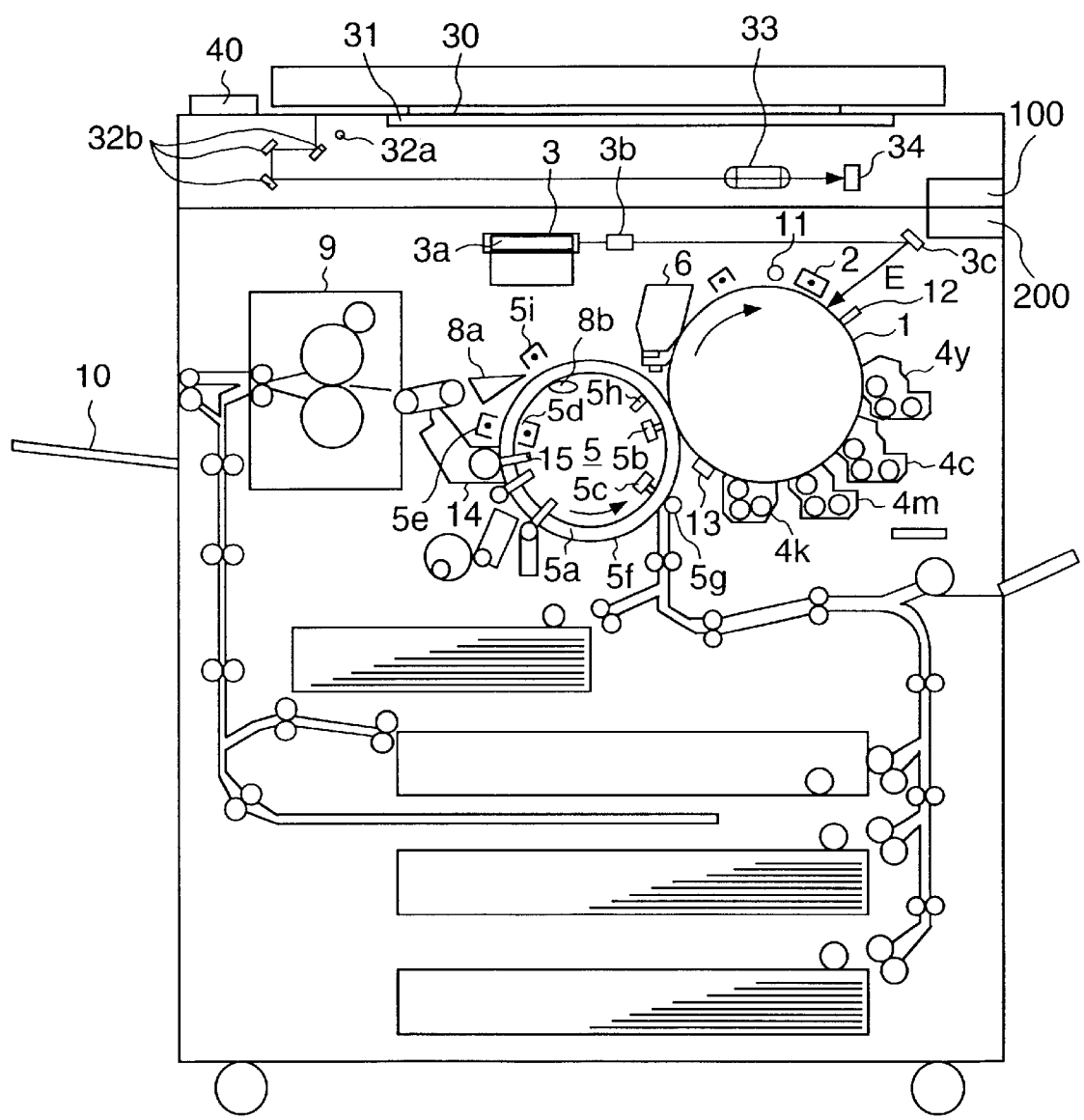
FIG. 1 is a sectional view showing the arrangement of a digital copying machine according to the first embodiment of the present invention.
Figure 2:
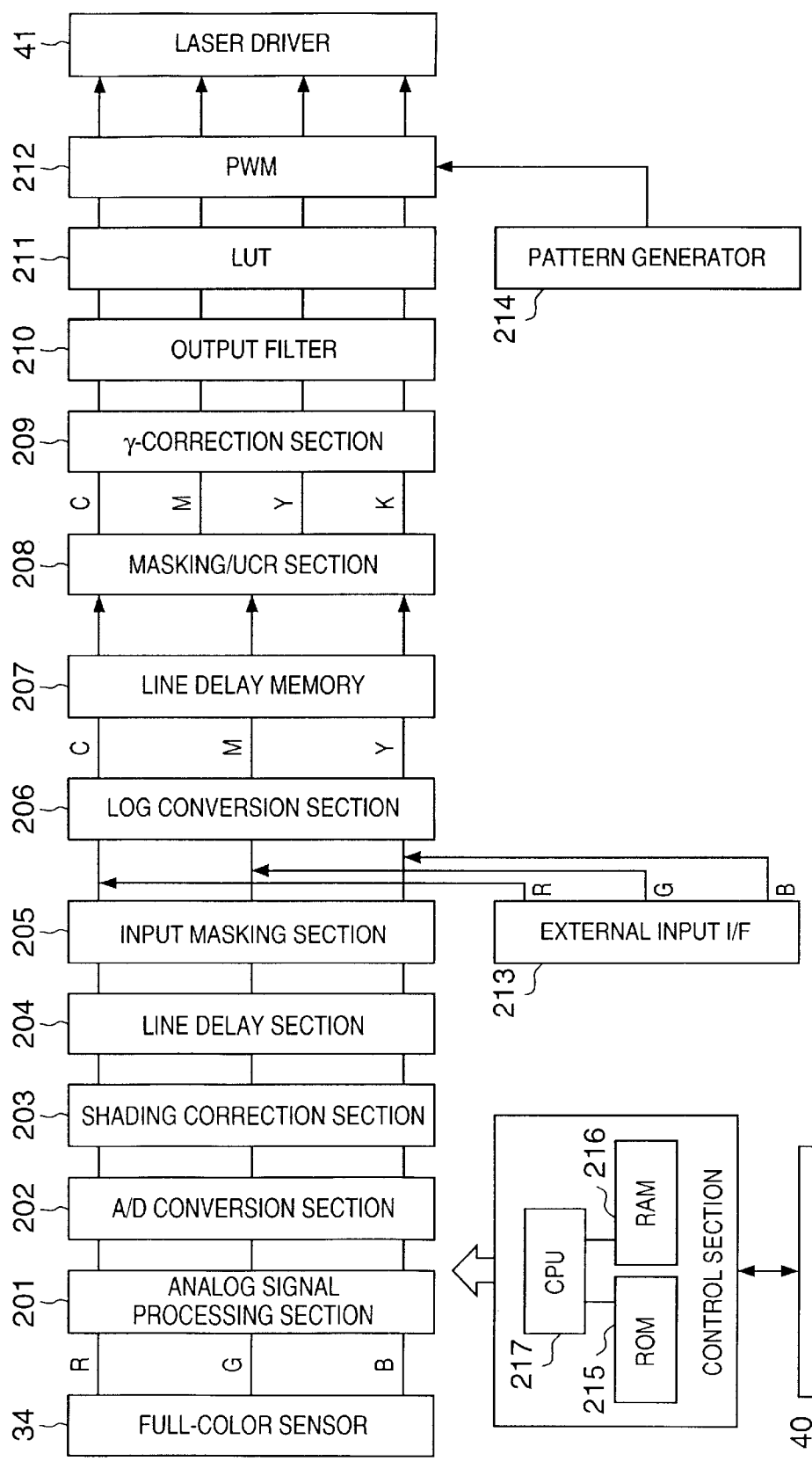
FIG. 2 is a block diagram showing the functional arrangement of a controller 100.

FIG. 1 is a sectional view showing the schematic arrangement of the digital copying machine. The digital copying machine shown in FIG. 1 has a reader section for reading an original image and generating an image signal, and a printer section for forming an image on a printing medium by electrophotography in accordance with an image signal sent from the reader section or an image signal input from an external device. Operations of the reader section and printer section, which will be described below, are controlled by controllers 100 and 200, respectively. As shown in FIG. 2 (to be described later), the controller 100 has a CPU 217 and controls in accordance with a program stored in a ROM in advance. The controller 200 also has a CPU (not shown) and controls in accordance with a program stored in a ROM (not shown) in advance.

In the reader section, when a copy key (not shown) in an operation section 40 is pressed, an original 30 placed on an original glass plate 31 is illuminated with light output from an exposure lamp 32a. Reflected light from the original 30 is guided through a plurality of mirrors 32b and a lens 33 and forms an image on a full-color sensor 34 comprised of a 3-line CCD.

In the full-color sensor 34, CCD line sensors of three colors: red (R), green (G), and blue (B) are arranged at predetermined intervals in the sub-scanning direction. Each line sensor has a plurality of light-receiving elements arrayed in a line. In the full-color sensor 34, the incident image of reflected light from the original 30 is decomposed into a plurality of pixels by the plurality of photoelectric conversion elements. Photoelectric conversion signals (color separation image signals) are generated in accordance with the densities of the pixels.

The RGB image signals generated by the full-color sensor 34 are subjected to image processing such as PWM (to be described later) by the controller 100 and then sent to the printer section as image signals having magenta (M), cyan (C), yellow (Y), and black (K) color components.

In the printer section 200, the image signal containing M, C, Y, and K components, which is sent from the reader section 100, is input to a polygon scanner 3 as a laser exposure optical system. The polygon scanner 3 has a semiconductor laser and a laser driver. The semiconductor laser is driven in accordance with the input image signal. A laser beam E emitted from the semiconductor laser is swept by a rotary polyhedral mirror 3a of the polygon scanner 3 and forms a spot image on a photosensitive drum 1 through an f-θ lens 3b and a fixed mirror 3c for directing the laser beam E to the photosensitive drum 1. The laser beam E scans the photosensitive drum 1 in the direction (main scanning direction) almost parallel to the rotational direction of the photosensitive drum 1. The laser beam E repeatedly scans the photosensitive drum 1 in the rotational direction (sub-scanning direction) of the photosensitive drum 1 to form an electrostatic latent image.

The photosensitive drum 1 as an image carrier has, on its surface, amorphous silicon, selenium, or OPC and is held to be rotatable in the direction of the arrow in FIG. 1. A pre-exposure lamp 11, primary charger 2 such as a corona charger, surface potential sensor 12, developers 4y, 4c, 4m, and 4k for four colors, light amount sensor 13, transfer section 5, and cleaner 6 are mounted around the photosensitive drum 1.

In image formation, the photosensitive drum 1 is rotated in the direction of the arrow by the controller 200, uniformly charge-removed by the pre-exposure lamp 11, and then uniformly charged by the primary charger 2. After that, the photosensitive drum 1 is scanned and exposed by the laser beam E modulated in accordance with the above-described image signal. An electrostatic latent image is formed on the photosensitive drum 1 by dot area modulation in accordance with the image signal.

The developers 4y, 4c, 4m, and 4k develop the electrostatic latent image on the photosensitive drum 1 using color toners of yellow, cyan, magenta, and black, respectively. More specifically, under the control of the controller 200, the electrostatic latent image formed on the photosensitive drum 1 is inverted and developed by the predetermined developers 4y, 4c, 4m, and 4k using dual component developing agents containing toners and carriers to form negatively charged visible images (toner images) based on a resin. The toners are prepared by dispersing color materials of the respective colors using a styrene-based copolymer resin as a binder. In inversion development, toners charged to the same polarity as that of the latent image are applied to an exposed area on the photoreceptor to make the image visible. Each developer is selectively set close to the photosensitive drum 1 by operation of an eccentric cam (not shown) in accordance with the separated color.

In this embodiment, the transfer section 5 has a transfer drum 5a serving as a printing medium carrier, a transfer brush charger 5b serving as a transfer means, a chuck brush charger 5c for electrostatically chucking the printing medium, a chuck roller 5g opposing the chuck brush charger 5c, an inner charger 5d, an outer charger 5e, and a transfer separation sensor 5h. A cylindrical printing medium carrier sheet 5f formed from a dielectric material such as polycarbonate is integrally stretched in the open surface area of the transfer drum 5a which is axially supported to be rotatably driven.

The controller 200 supplies a printing medium in a printing medium cassette 7 to a position opposing the photosensitive drum 1 via the convey system and transfer unit 5 at a predetermined timing and carries the printing medium on the printing medium carrier sheet 5f by an electrostatic force. The toner images formed on the photosensitive drum 1 are transferred to the printing medium on the printing medium carrier sheet 5f as the transfer drum 5a rotates.

After the toner images of a desired number of colors are transferred to the printing medium, the controller 200 actuates a separation gripper 8a, separation thrust roller 8b, and separation charger 5i to separate the printing medium from the transfer drum 5a and deliver the medium onto a tray 10 via a thermal roller fuser 9. With this operation, a full-color image is formed on the printing medium.

After transfer of the toner images, the controller 200 causes the cleaner 6 constructed by a cleaning blade and a squeegee to remove residual toners on the surface of the photosensitive drum 1 and prepares for the next image formation process.

To prevent the powder on the printing medium carrier sheet 5f of the transfer drum 5a from scattering and sticking and oil from sticking to the printing medium, cleaning is performed using a fur brush 14 and a back-up brush 15 opposing the fur brush 14 via the printing medium carrier sheet 5f. This cleaning is performed before or after image formation, or occasionally performed when jam (paper jam) occurs.

The operation section 40 inputs an instruction from the user or notifies the user of the apparatus status.

Image Processing Block

FIG. 2 is a block diagram showing the functional arrangement of the controller 100 in the reader section. This will be described below.

The RGB image signals output from the full-color sensor 34 are input to an analog signal processing section 201 to adjust the gains or offsets. After this, the RGB image signals are converted into, e.g., 8-bit RGB digital signals (0 to 255 levels: 256 gray levels) in units of color components by an A/D conversion section 202.

The RGB digital signals input to a shading correction section 203 are subjected to general shading correction to optimize the gains in correspondence with the individual light-receiving elements of the full-color sensor 34, which are arrayed in a line, thereby eliminating variations in sensitivity between the individual light-receiving elements.

A line delay section 204 corrects any spatial offset contained in the image signals output from the shading correction section 203. This spatial offset occurs because the line sensors of the full-color sensor 34 are separated from each other at a predetermined distance in the sub-scanning direction. More specifically, the R and G color component signals are line-delayed in the sub-scanning direction using the B color component signal as a reference, thereby synchronizing the phases of the three color component signals.

An input masking section 205 converts the color space of the image signals output from the line delay section 204 into, e.g., the NTSC-RGB standard color space. More specifically, the color space of the color component signals output from the full-color sensor 34, which is determined by the spectral characteristics of the filters for the color components, is converted into the NTSC-RGB standard color space.

$$\begin{pmatrix} Ro \\ Go \\ Bo \end{pmatrix} = \begin{pmatrix} a11 & a12 & a13 \\ a21 & a22 & a23 \\ a31 & a32 & a33 \end{pmatrix} \begin{pmatrix} Ri \\ Gi \\ Bi \end{pmatrix}$$

Ro, Go, Bo: output image signals
Ri, Gi, Bi: input image signals

Color image data displayed on, e.g., a CRT display is input from an external device (not shown) such as a computer through an external input interface 213, as needed.

A LOG conversion section 206 is formed from a loop-up table (LUT) in, e.g., a ROM and converts the RGB luminance signals output from the input masking section 205 into CMY density signals.

A line delay memory 207 delays the image signals output from the LOG conversion section 206 by a period (line delay period) for which a black character determination section (not shown) generates control signals UCR, FILTER, and SEN on the basis of the outputs from the input masking section 205. The control signal UCR controls the masking/UCR parameter in a masking/UCR section 208. The control signal FILTER is used to control the edge enhancement amount of an output filter 210. When the black character determination section (not shown) determines a black character, the control signal SEN is used to switch the coefficient (line count) of a PWM 212 to increase the resolution.

The masking/UCR section 208 extracts a black component signal K from the image signals output from the line delay memory 207. The masking/UCR section 208 also executes matrix calculation on the MCYK image signals to correct any chromatic blur on the printing medium in the printer section and outputs frame-sequential color component image signals of, e.g., 8 bits every reading operation of the reader section in the order of M, C, Y, and K. The matrix coefficient used for matrix calculation is set by the CPU 217.

A γ-correction section 209 corrects the densities of the CMYK image signals output from the masking/UCR section 208 to match the image signals with ideal gradation characteristics of the printer section. The output filter (spatial filter processing section) 210 performs edge enhancement or smoothing processing for the image signals output from the γ-correction section 209 in accordance with a control signal from the CPU 217.

An LUT 211 is used to match the density of the original image with that of the output image and is formed from, e.g., a RAM. The conversion table is set by the CPU 217.

The pulse width modulator (PWM) 212 outputs pulse signals with pulse widths corresponding to the levels of the image signals input from the LUT 211. The pulse signals are input to a laser driver 41 for driving the semiconductor laser in a laser exposure optical system 3, as described above.

A pattern generator 214 holds predetermined patch pattern information for density correction in this embodiment. The pattern generator 214 outputs the information to the PWM section 212 as needed to perform patch detection processing (to be described later).

In this embodiment, the functions shown in FIG. 2 are implemented by the controller 100 of the reader section. However, these functions may be implemented by the controller 200 of the printer section. More specifically, the RGB image signals read by the full-color sensor 34 in the reader section are appropriately converted into CMYK signals that allow image formation in the printer section and supplied to the laser driver 41.

Pulse Width Modulation

In this embodiment, gradation is reproduced by pulse width modulation processing. Pulse width modulation by the PWM section 212 will be described below in detail.

Figure 3:
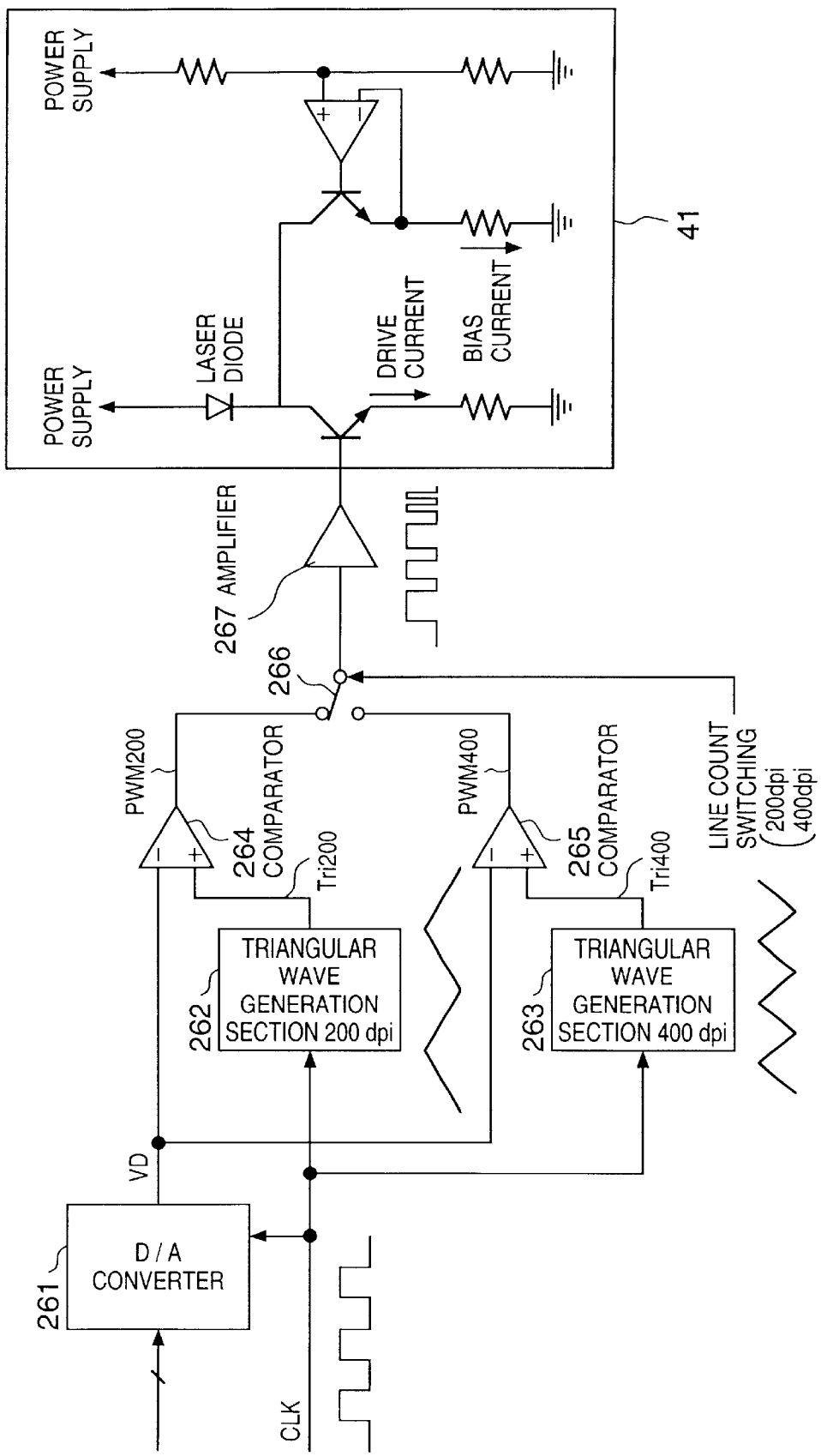
FIG. 3 is a block diagram showing the circuit arrangement of a PWM section.
Figure 4:
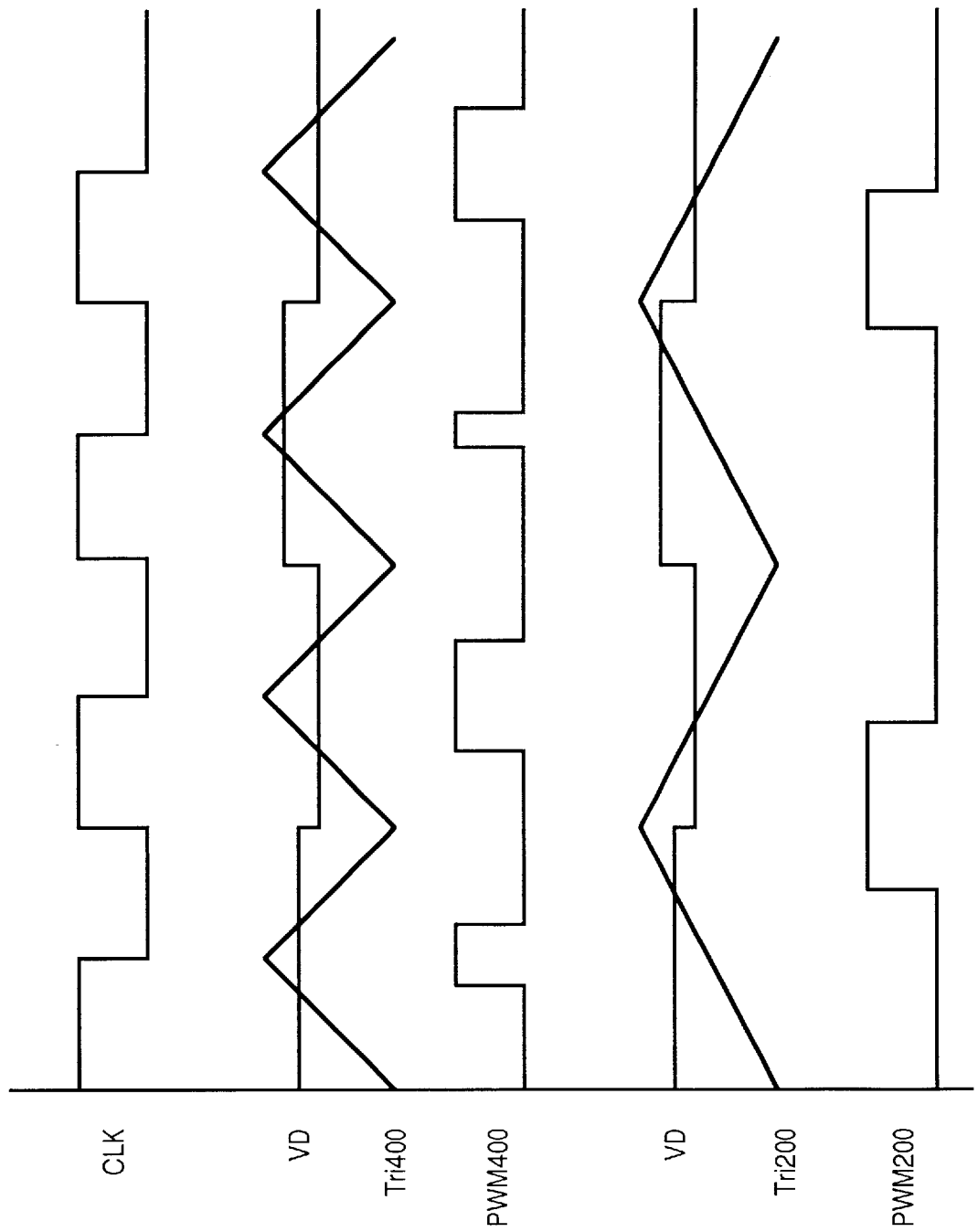
FIG. 4 is a graph showing waveforms in pulse width modulation.

FIG. 3 is a block diagram showing the detailed arrangement of the PWM circuit 212. FIG. 4 is a graph showing main waveforms in the PWM circuit 212.

A digital image signal input in synchronism with an image clock CLK is converted into an analog image signal VD by a D/A converter 261. A comparator 264 receives the analog image signal VD and a triangular wave Tri 200 corresponding to 200 dpi and generated by a triangular wave generation section 262 in synchronism with the clock CLK. A comparator 265 receives the analog image signal VD and a triangular wave Tri 400 corresponding to 400 dpi and generated by a triangular wave generation section 263 in synchronism with the clock CLK. An output PWM 200 or PWM 400 from the comparator 264 or 265 is input to an amplifier 267 through a switch 266 controlled by a line count (resolution) switching signal, amplified, and sent to the laser driver 41.

The characteristic feature of pulse width modulation by the PWM section 212 of the first embodiment will be described with reference to FIGS. 5 and 6.

Figure 5:
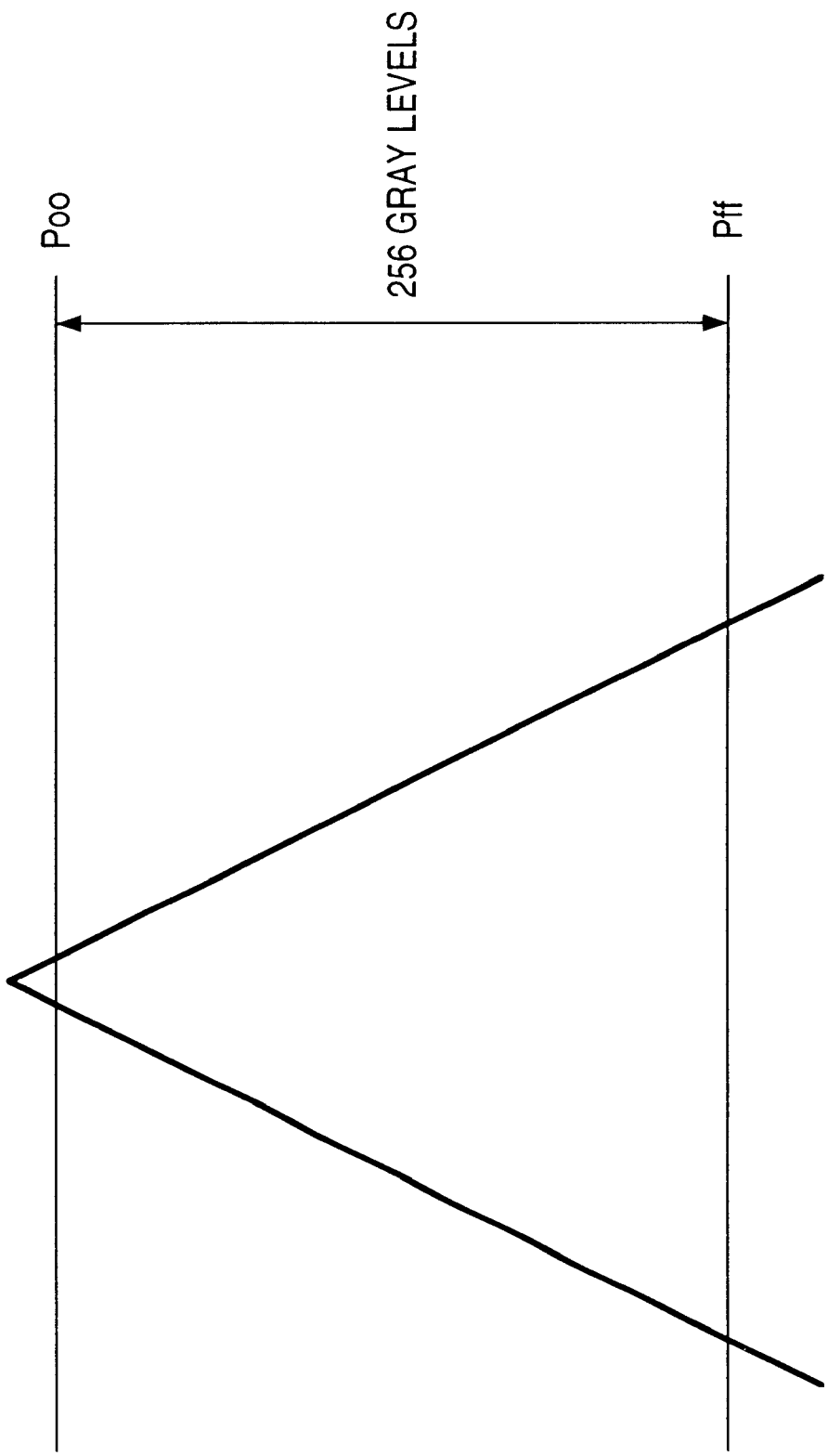
FIG. 5 is a graph showing the relationship between the image signal level and pulse width.

FIG. 5 is a graph showing the relationship between an minimum output pulse width (minimum pulse width: P00) corresponding to a minimum level 00h of a digital image signal and a maximum output pulse width (maximum pulse width: Pff) corresponding to a maximum level FFh of the digital image signal in the conventional PWM. That is, a predetermined number of gray levels (256 gray levels) are guaranteed between the minimum pulse width P00 and the maximum pulse width Pff.

Figure 6:
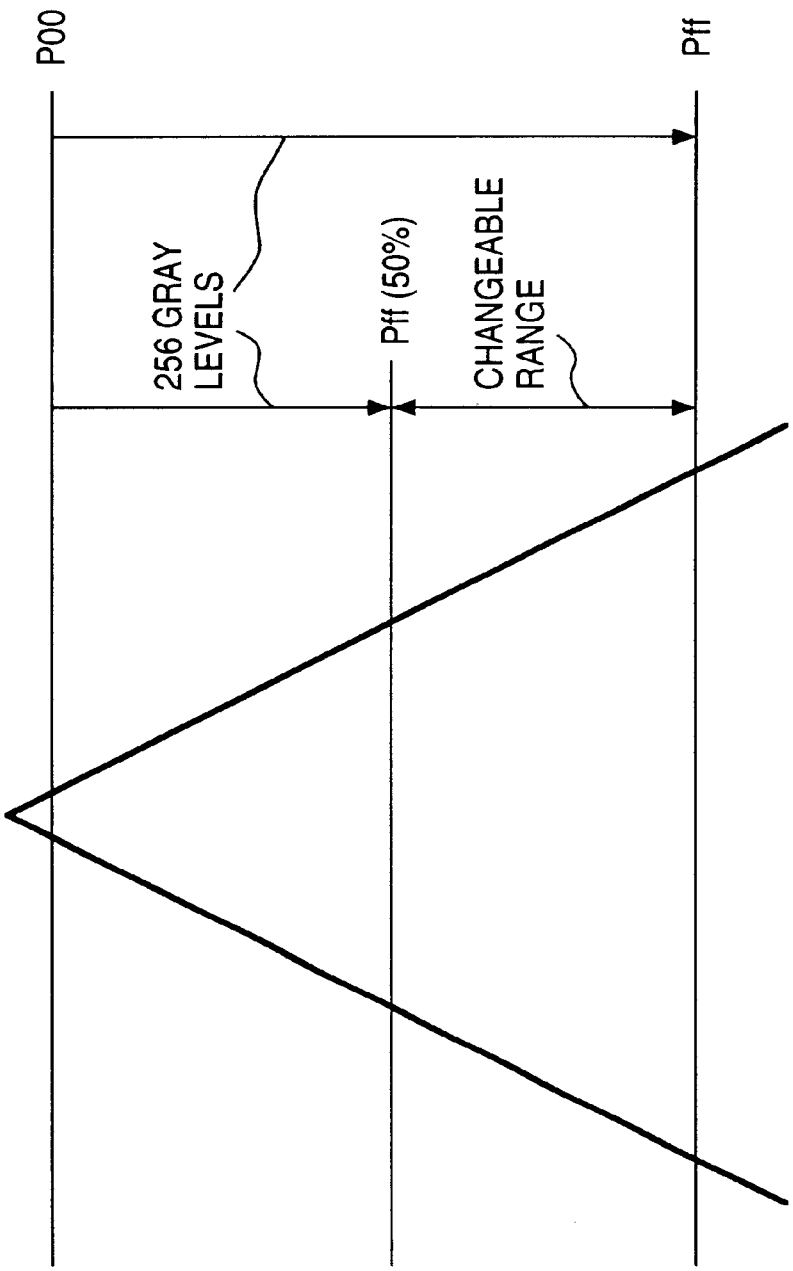
FIG. 6 is a graph showing the relationship between the image signal level and pulse width.

FIG. 6 is a graph showing the relationship between the minimum pulse width P00 and the maximum pulse width Pff in PWM of this embodiment. As the characteristic feature of the PWM circuit 212 of this embodiment, the maximum pulse width Pff can be changed within the range of 50% to 100% of the maximum pulse width that can be actually output, by adjusting the gain of the D/A converter 261. In this embodiment, even when the maximum pulse width Pff is narrowed to, e.g., 50%, the number of gray levels is preserved, and the image quality does not suffer.

The maximum pulse width Pff which can be changed in this embodiment can take not only the range of 50% to 100% of the maximum pulse width corresponding to the maximum level FFh of the digital image signal but also an arbitrary range such as the range of 30% to 100%.

Contrast Potential

Figure 7:
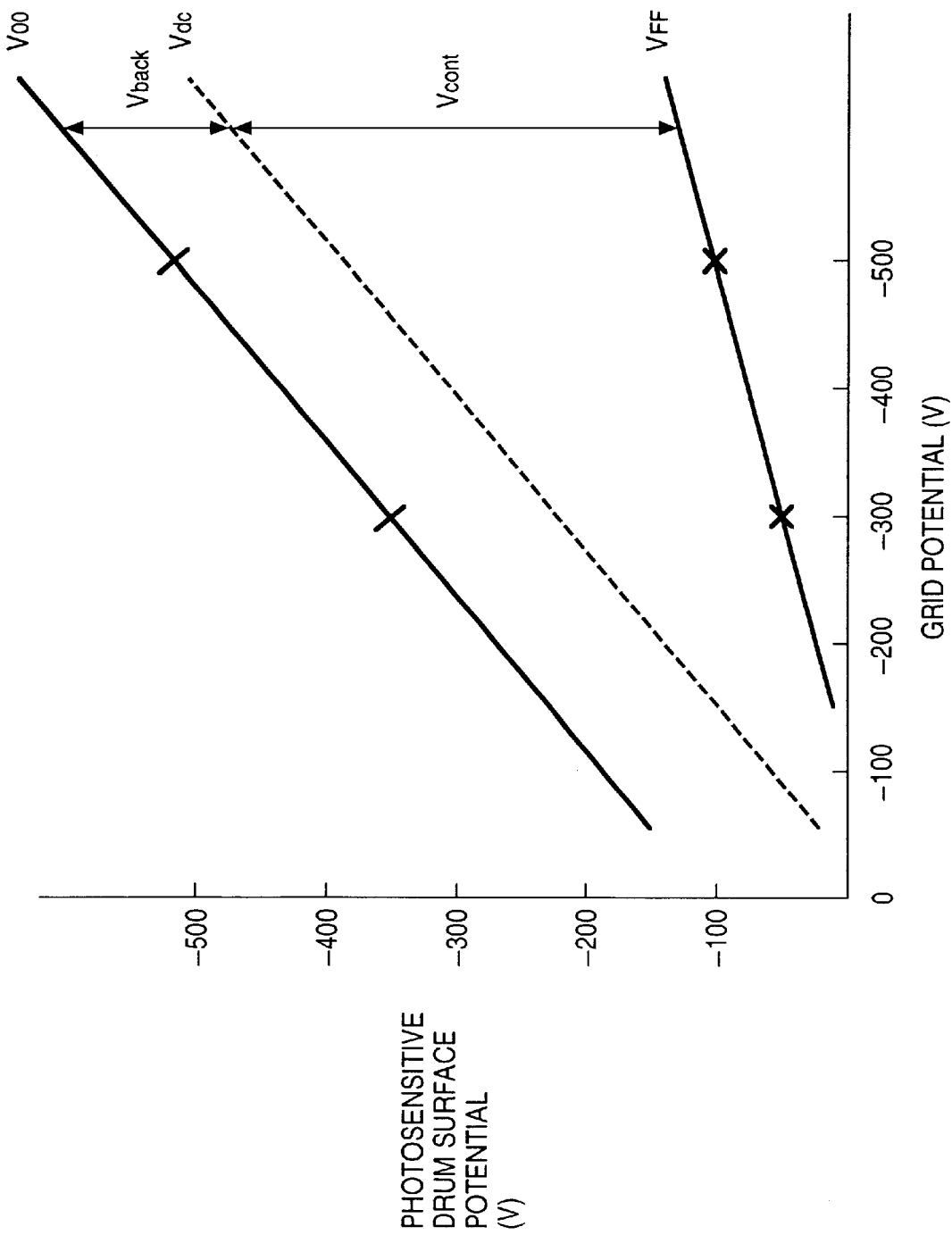
FIG. 7 is a graph showing potential control in the first embodiment.

Potential control in this embodiment, i.e., the method of controlling the grid potential (potential of the primary charger 2) and development bias potential on the basis of the contrast potential will be described next with reference to FIG. 7. FIG. 7 is a graph showing the relationship between a primary charging voltage (abscissa) generally called a grid potential and obtained by the primary charger 2 and the surface potential (ordinate) of the photosensitive drum 1, which is measured by the surface potential sensor 12.

First, the grid potential is fixed at −300 V. A potential (drum potential) V00 on the surface of the photosensitive drum 1 when the drum surface is scanned as the light-emission pulse width of the laser is set at the minimum level corresponding to the level 00h of the image signal, and a drum potential Vff when the drum surface is scanned as the light-emission pulse width is set at the maximum level corresponding to the level FFh of the image signal are measured by the surface potential sensor 12. In a similar way, potentials V00 and Vff when the grid potential is fixed at −500 V are measured. These measurement results are interpolated and extrapolated to obtain the relationship between the grid potential and the drum potential shown in FIG. 7.

A voltage Vback (about 100 V) is set in advance to prevent fog toners from sticking to the image formed on the photosensitive drum 1. A development bias voltage Vdc having a difference corresponding to the voltage Vback with respect to the potential V00 is set. When the voltage Vback is 70 V or less, fog occurs. When the voltage Vback is 180 V or more, the carrier sticks to the photosensitive drum 1. A potential Vcont is the difference voltage between the development bias voltage Vdc and the drum potential Vff and is substantially a contrast potential. When the contrast potential Vcont is high, the toner sticking amount increases, and a high density is obtained in the formed image.

Figure 8:
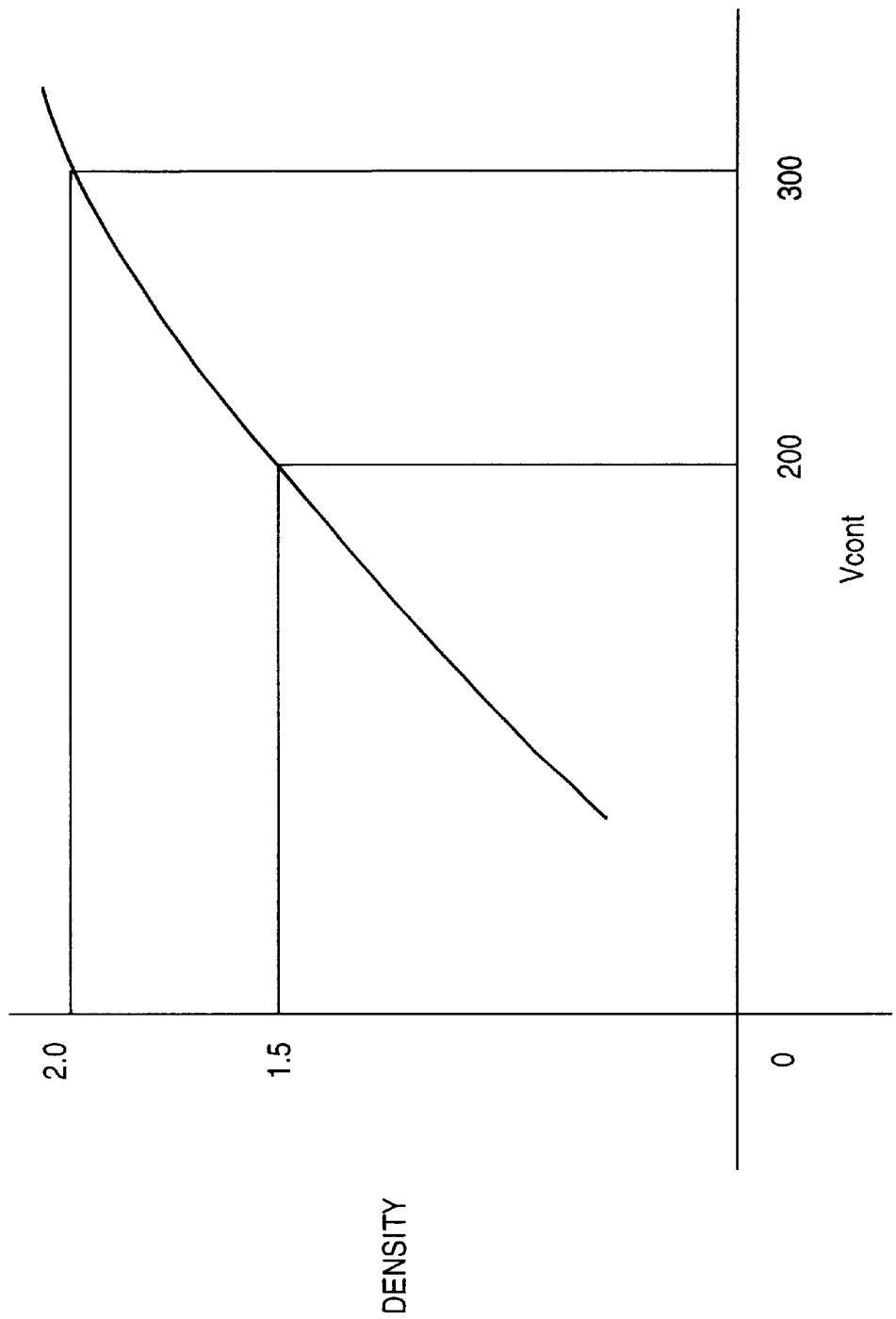
FIG. 8 is a view showing the relationship between the contrast potential and maximum density.

FIG. 8 shows the relationship between the contrast potential Vcont and the maximum density reproduced when the maximum pulse width Pff is 100% the maximum value.

In this embodiment, first, the contrast potential Vcont is set at 300 V such that the maximum density becomes 2.0.

Next, the maximum pulse width Pff is decreased to 75% the maximum value that can be output to set the maximum density to be actually output at 1.5, and normal image formation is performed. That is, the initial value of the maximum pulse width Pff is set at 75%. When the maximum pulse width Pff is increased to 100% as needed, image characteristics with which the maximum density of the formed image is 2.0 can be obtained.

When the maximum pulse width Pff is controlled to change the maximum density, the density can be controlled while keeping the conversion table in the LUT 211 unchanged.

Setting of Vcont and Pff

To set maximum density, conventionally, only the contrast potential Vcont is used as a parameter. More specifically, a patch corresponding to the maximum density value is formed on the photosensitive drum 1 for each of the MCYK colors. The development bias voltage Vdc and the primary charge voltage are adjusted such that the maximum density value of each color becomes 1.5.

However, as the image forming speed increases, it becomes difficult to control the maximum density value in the single photosensitive drum system by the above-described image forming process amount control (potential control). That is, potential control for each of the MCYK colors becomes unstable. In this embodiment, the maximum density value is controlled by adjusting the maximum pulse width Pff of PWM to make it possible to stably control the maximum density value at a high speed.

Figure 16:
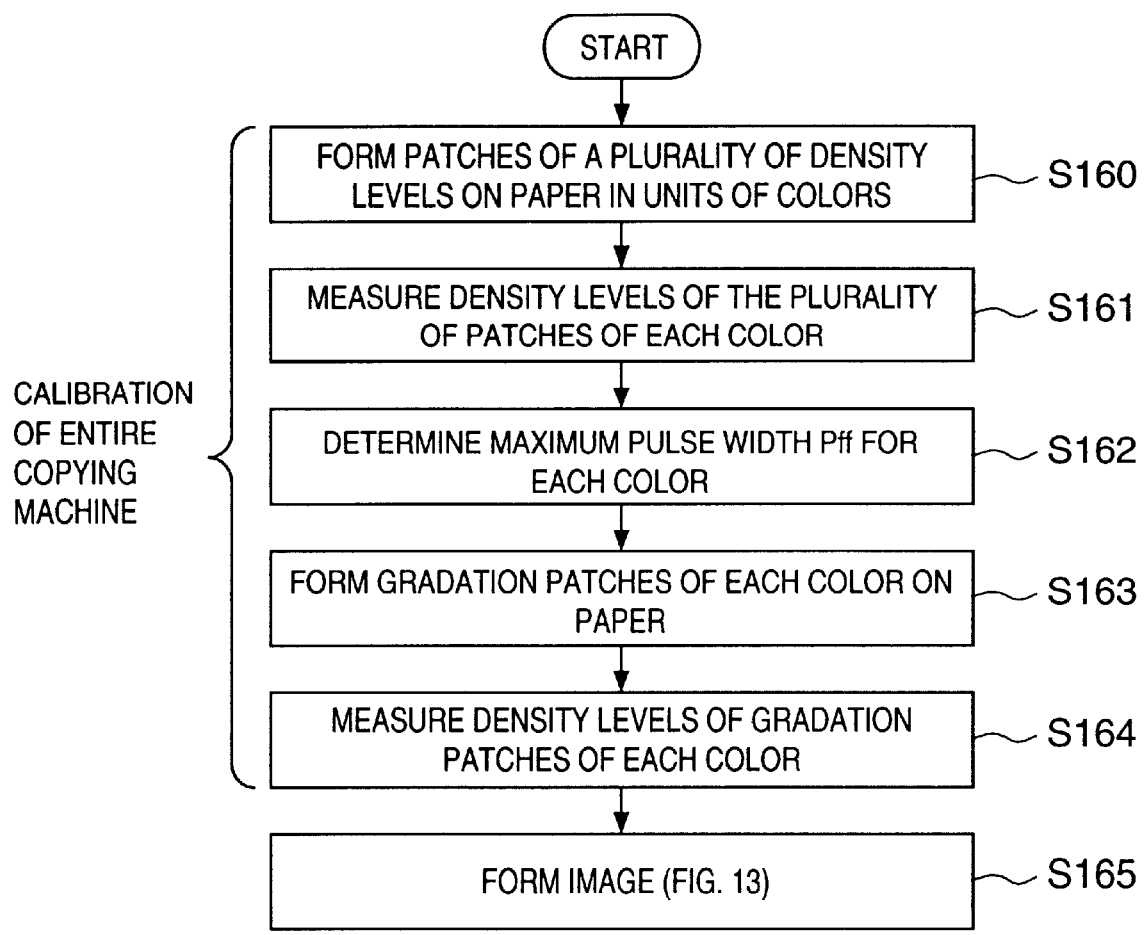
FIG. 16 is a flow chart showing setting of maximum pulse width.

Procedures associated with setting of the maximum pulse width Pff will be described below with reference to FIG. 16.

(1) The pattern generator 214 forms patches (gradation patches) of a plurality of density levels on paper in units of colors. At this time, the maximum pulse width Pff is 100% (S160).

(2) The patches of each color are read with the full-color sensor 34. The density levels of the plurality of patches for each color are measured (S161). On the basis of the measured density levels, the maximum pulse width Pff for obtaining a predetermined density value is obtained in units of colors (S162). For example, when the density level for obtaining a density of 1.6 is 128, the maximum pulse width Pff is set at 50%.

(3) The pattern generator 214 forms gradation patches (a plurality of patches having different densities) on paper in units of colors (S163). At this time, the maximum pulse widths Pff obtained in (2) are used for the respective colors.

(4) The gradation patches of each color are read with the full-color sensor 34. The density levels of the gradation patches of each color are measured (S164). On the basis of the measured density levels, table data of the LUT 211 is prepared.

The procedures (1) to (4) (steps S160 to S164 in FIG. 16) are performed, e.g., once a day to optimize the entire apparatus.

To the contrary, the following procedure (step S165 in FIG. 16) is performed every color image formation.

(5) Every time color images of MCYK are formed to reproduce a color image, the maximum pulse widths Pff obtained in (2) are set for the respective colors (S165). When patches (e.g., level 40) are to be formed on the photoreceptor to control the toner supply amounts (T/C ratios), a fixed value is used as the maximum pulse width Pff (e.g., 75% for all colors). Details of processing in step S165 will be described later with reference to FIG. 13.

With the above procedures, the above-described problem can be solved.

Gradation Patch Detection Processing

A gradation patch detection method of this embodiment will be described below.

Figure 9:
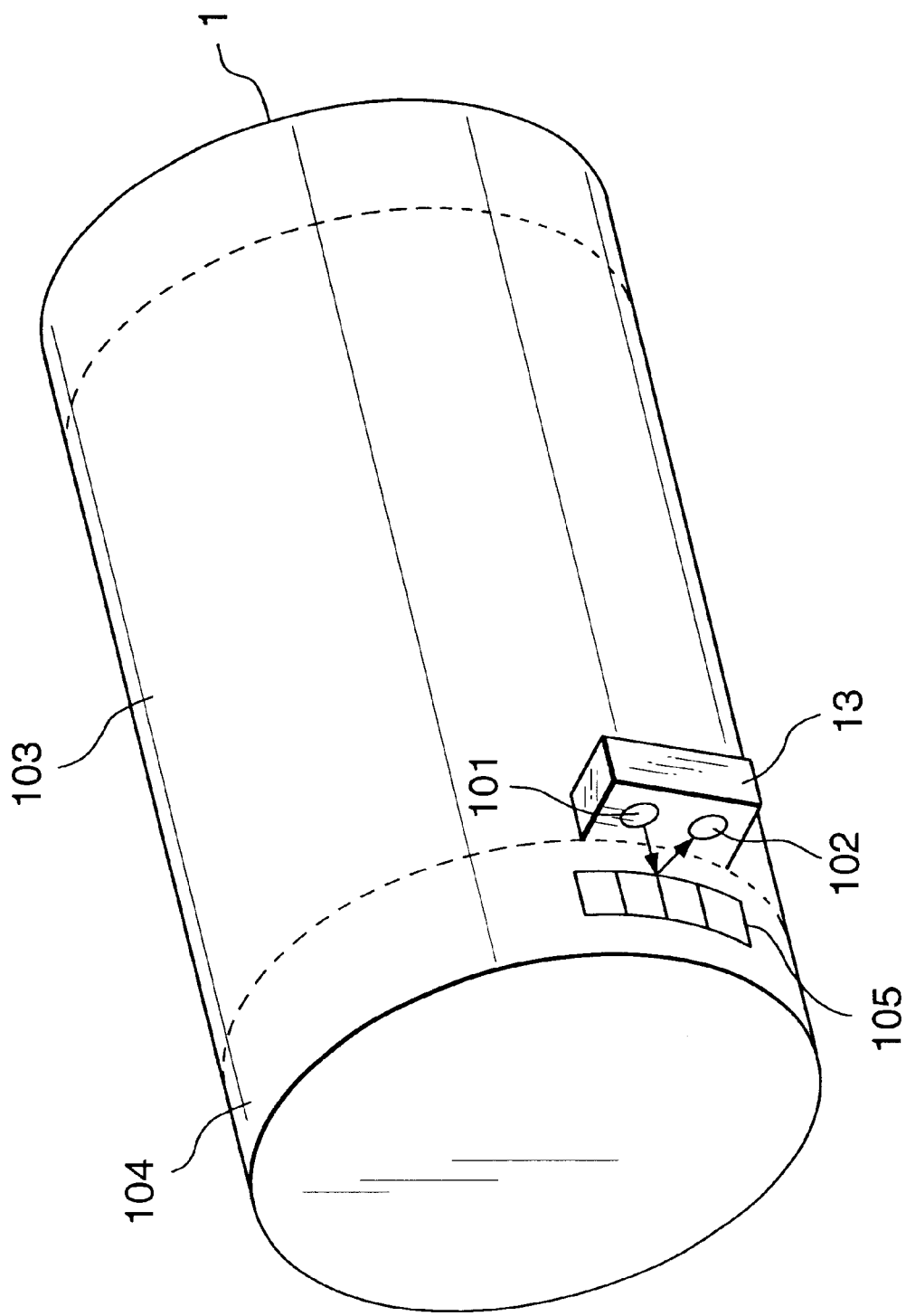
FIG. 9 is a view showing an arrangement for patch detection processing.

FIG. 9 is a view schematically showing an arrangement for patch detection processing of measuring the density of a patch formed on the photosensitive drum 1 using the light amount sensor 13. Referring to FIG. 9, reference numeral 103 denotes an area (image formation area) where an electrostatic latent image is formed on the photosensitive drum 1; and 104, an area (non-image formation area) where no electrostatic latent image is formed. A patch based on patch pattern information held by the pattern generator 214 is formed in the non-image formation area 104. The patch density is measured with the light amount sensor 13 constructed by an LED 101 and a photosensor 102. The patch is formed from a plurality of patterns having predetermined density values different from each other in units of CMYK colors.

Figure 10:
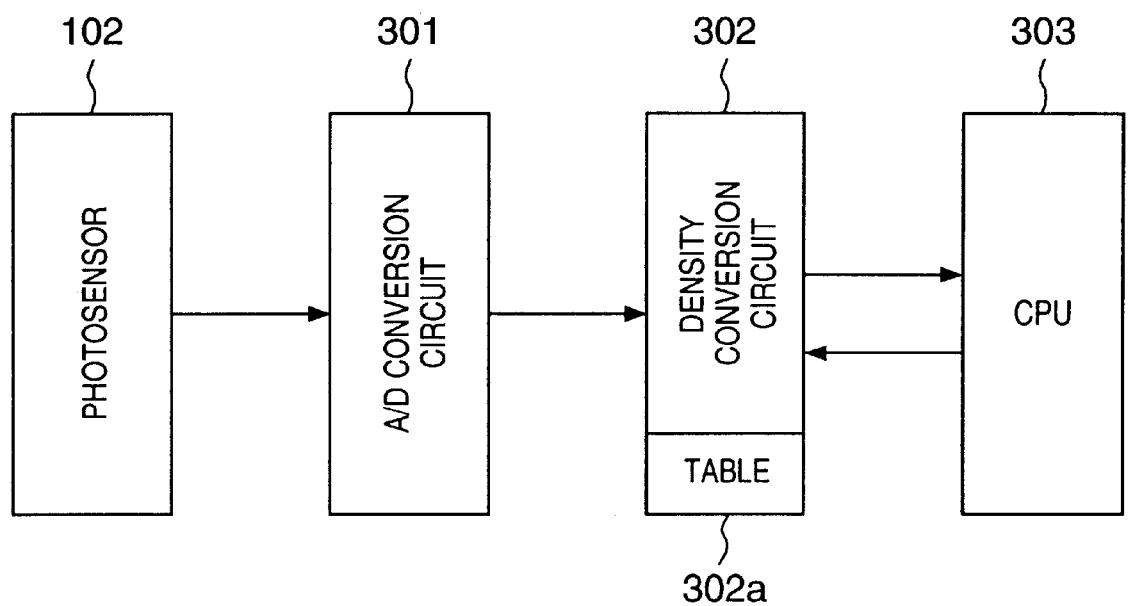
FIG. 10 is a block diagram showing an arrangement for processing a signal input to a photosensor.

FIG. 10 shows an arrangement for processing a signal input to the photosensor 102. Referring to FIG. 10, near-infrared light as reflected light from the patch formed on the photosensitive drum 1 becomes incident on the photosensor 102 and is converted into an electrical signal by the photosensor 102. The electrical signal with an output voltage of 0 to 5 V is converted into a digital luminance signal of one of levels 0 to 255. The signal is converted into a density signal by a density conversion circuit 302.

The density conversion circuit 302 performs actual conversion processing by looking up a conversion table 302a. The characteristics of the conversion table 302a will be described below.

FIGS. 11A to 11D show the spectral characteristics of color toners used in this embodiment. FIGS. 11A to 11C show the spectral characteristics of Y, M, and C toners, respectively. As is apparent from these figures, the reflectance of each toner for near-infrared light (960 nm) is 80% or more. As described above, in this embodiment, dual component development advantageous in color purity and transparency is employed to form color toner images.

FIG. 11D shows the spectral characteristics of the K toner. In this embodiment, the K toner is developed by dual component development, like the remaining color toners. To reproduce pure black, carbon black is used as a color material. Hence, as shown in FIG. 11D, the reflectance for near-infrared light (960 nm) is as low as about 10%.

When the photosensitive drum 1 is, e.g., an OPC drum, the reflectance on the drum surface for near-infrared light (960 nm) is about 40%. An amorphous-silicon-based drum may be used as far as the reflectance is nearly equal.

Figure 12:
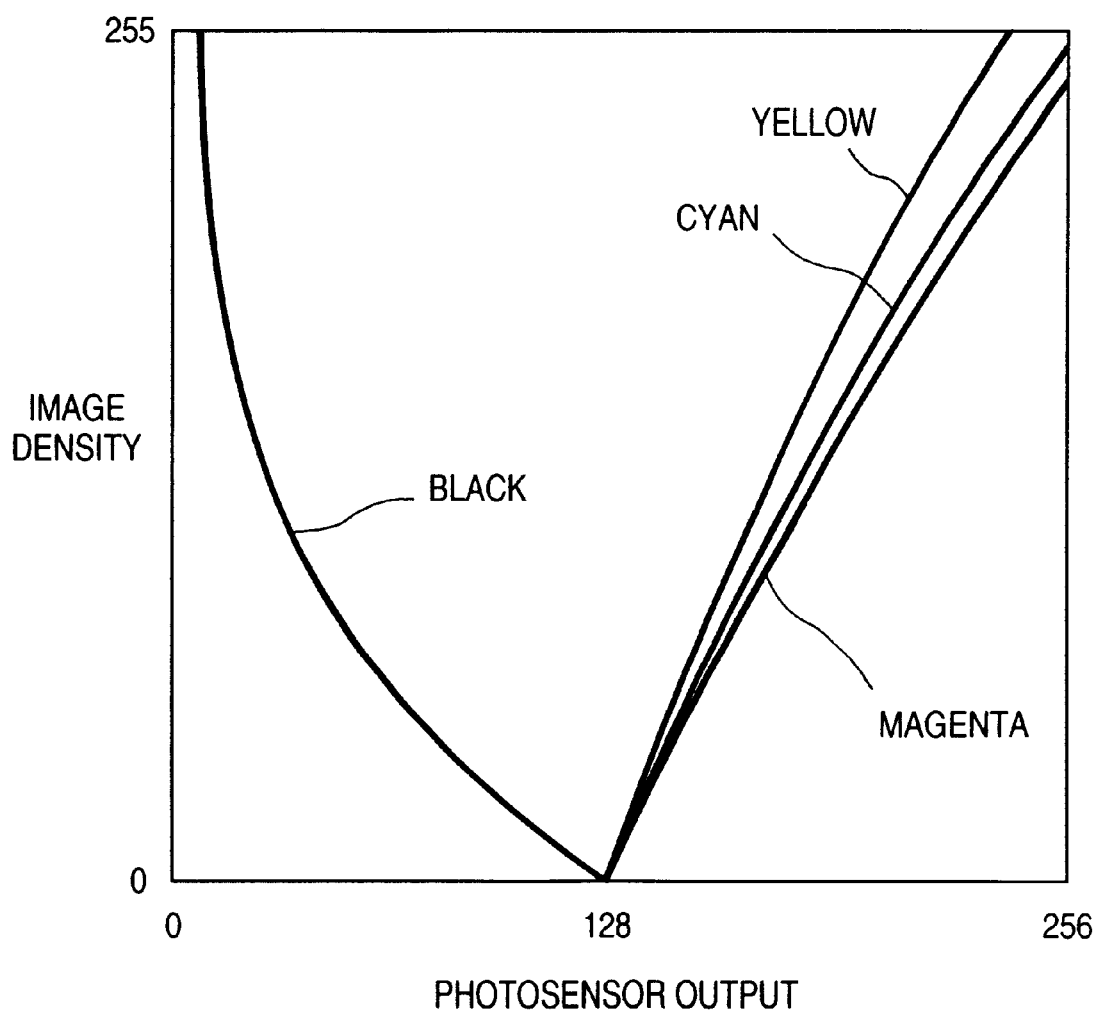
FIG. 12 is a graph showing the relationship between the photosensor output and image density.

FIG. 12 shows the relationship between the output from the photosensor 102 and the output image density when the density on the photosensitive drum 1 is gradually changed in accordance with dot area modulation of each color. In this embodiment, in a state wherein no toner sticks to the photosensitive drum 1, the output from the photosensor 102 is set at 2.5 V (level 128) as a median.

As is apparent from FIG. 12, for the Y, M, and C toners, when the area coverage on the surface of the photosensitive drum 1 increases and the image density increases, the output from the photosensor 102 becomes larger than that when no toner sticks to the photosensitive drum 1 (128). For the K toner, when the area coverage on the surface of the photosensitive drum 1 increases and the image density increases, the output from the photosensor 102 becomes smaller than that when no toner sticks to the photosensitive drum 1 (128).

The table 302a is prepared to convert the sensor output signal for each color into a density signal on the basis of the above characteristics. The density of each color can be accurately detected with the light amount sensor 13.

Exposure Amount Control

Laser exposure amount control of this embodiment will be described below.

In this embodiment, a patch having a predetermined density is formed in the non-image formation area 104 on the photosensitive drum 1. The T/C ratio or the contrast potential Vcont is controlled such that a predetermined density measurement result is obtained, thereby stabilizing the gradation characteristics.

However, as described in the prior art, when the maximum pulse width Pff is arbitrarily changed to change the maximum density that can be output by the apparatus, the laser exposure amount forming the patch for gradation control also changes, and it becomes hard to accurately control gradation on the basis of the patch.

As the characteristic feature of this embodiment, change in the maximum pulse width Pff is made effective only in the image formation area 103 on the photosensitive drum 1. In the non-image formation area 104 where the patch is formed, the maximum pulse width Pff always keeps 75% independently of the changed value.

Figure 13:
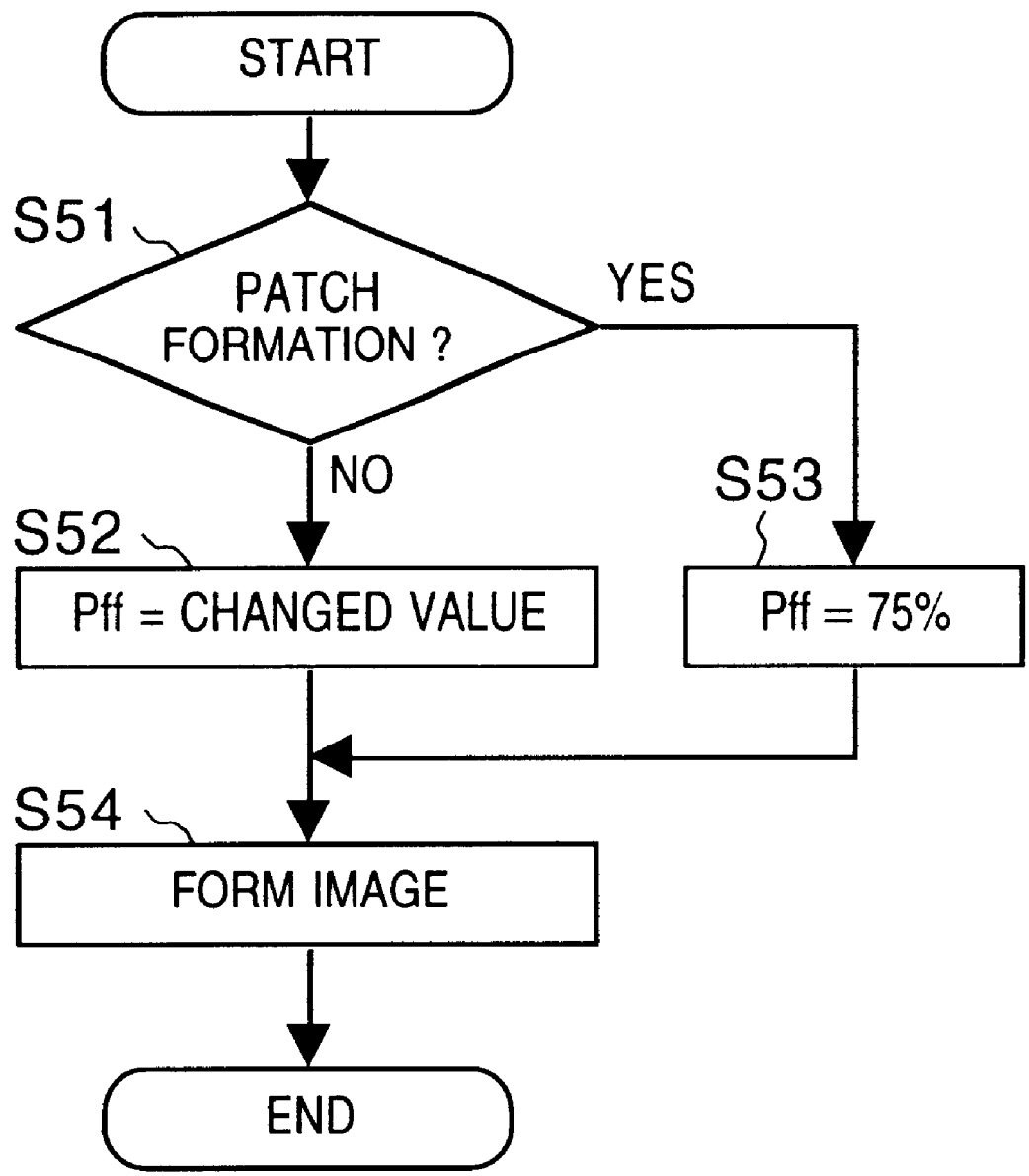
FIG. 13 is a flow chart showing exposure amount control.

FIG. 13 is a flow chart showing exposure control in this embodiment. This will be described below in detail. Note that the maximum pulse width Pff is arbitrarily changed by, e.g., the user.

Referring to FIG. 13, it is determined in step S51 whether this exposure is to be performed to form a patch in the non-image formation area 104. This determination may be made on the basis of the scanning position on the photosensitive drum 1 or whether the image signal is input from the pattern generator 214. If exposure is to be performed for normal image formation, the flow advances to step S52 to set the changed maximum pulse width Pff in the PWM section 212. If exposure is to be performed to form a patch, the flow advances to step S53 to set the maximum pulse width Pff at a predetermined value, i.e., 75% the maximum value independently of the changed value.

In step S54, the PWM section 212 performs pulse modulation on the basis of the set maximum pulse width Pff to form an image on the photosensitive drum 1.

The gradation patches formed in units of CMYK colors are read with the sensor 13, and a CPU 303 (printer section CPU) prepares a density conversion table for each color and sets it in the LUT 211 via CPU 217 (scanner section CPU).

As described above, according to the first embodiment, even when the maximum pulse width Pff for image formation is changed, the maximum pulse width Pff for patch formation is not changed. A predetermined exposure amount can be maintained for patch formation, so gradation can be accurately corrected on the basis of the measured density of the patch.

In the above-described embodiment, the patch is formed in the non-image formation area (end portion of the photosensitive drum 1). However, the patch may be formed in the intervals between sheets in the image formation area.

Second Embodiment

The second embodiment of the present invention will be described below.

In the above-described first embodiment, even when the maximum pulse width Pff for image formation is changed, the maximum pulse width Pff for patch formation is not changed to maintain a predetermined exposure amount for patch formation. As the characteristic feature of the second embodiment, for patch formation, a maximum pulse width Pff is changed, as in normal image formation, and the laser level for the patch is changed to maintain a predetermined exposure amount. The apparatus arrangement and control therefor in the second embodiment are the same as in the first embodiment, and a detailed description thereof will be omitted.

In the second embodiment, in normal image formation, an image is formed while setting the maximum pulse width Pff at 75% the maximum value. For patch formation as well, the maximum pulse width Pff is set at 75%.

Assume that a patch corresponding to level $30h$ (=48) of a digital image signal is to be formed. In this case, the maximum pulse width Pff is changed to 90% to increase the maximum density. To obtain the same exposure amount as that before change in the maximum pulse width Pff in forming a patch corresponding to $30h$, level 40 (=$28h$) is output in accordance with $$48 \times 75/90 = 40$$

The patch is formed on the basis of the same exposure amount as that before change.

Figure 14:
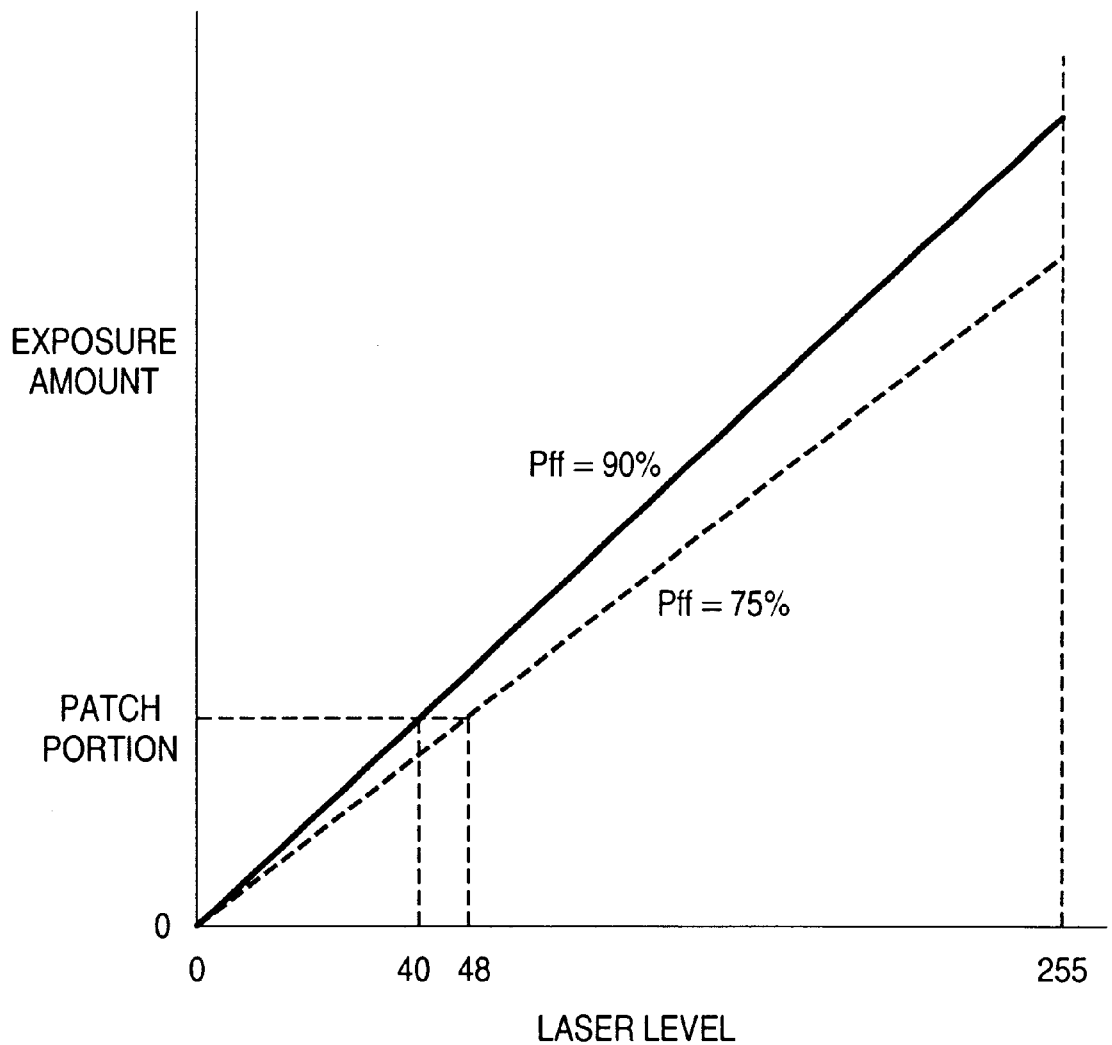
FIG. 14 is a graph showing the exposure amount of patch level in the second embodiment of the present invention.

FIG. 14 shows the relationship between the laser level and the exposure amount in the second embodiment. Referring to FIG. 14, when the maximum pulse width Pff is changed from 75% to 90%, the exposure amount increases across all levels. Hence, in patch formation with the maximum pulse width Pff at 90%, to obtain the same exposure amount as that at laser level 48 when the maximum pulse width Pff is at 75%, the laser level is reduced to 40.

As described above, according to the second embodiment, when the maximum pulse width Pff is changed, the patch output level is inversely corrected by the change amount of the maximum pulse width Pff, thereby obtaining a predetermined exposure amount for patch formation. Hence, gradation can be accurately corrected on the basis of the measured density of the patch.

Third Embodiment

The third embodiment of the present invention will be described below.

In the above-described first and second embodiments, the present invention is applied to a full-color digital copying machine. The present invention is not limited to this and is also effective for a monochromatic digital copying machine. In the third embodiment, the present invention is applied to a monochromatic digital copying machine.

Figure 15:
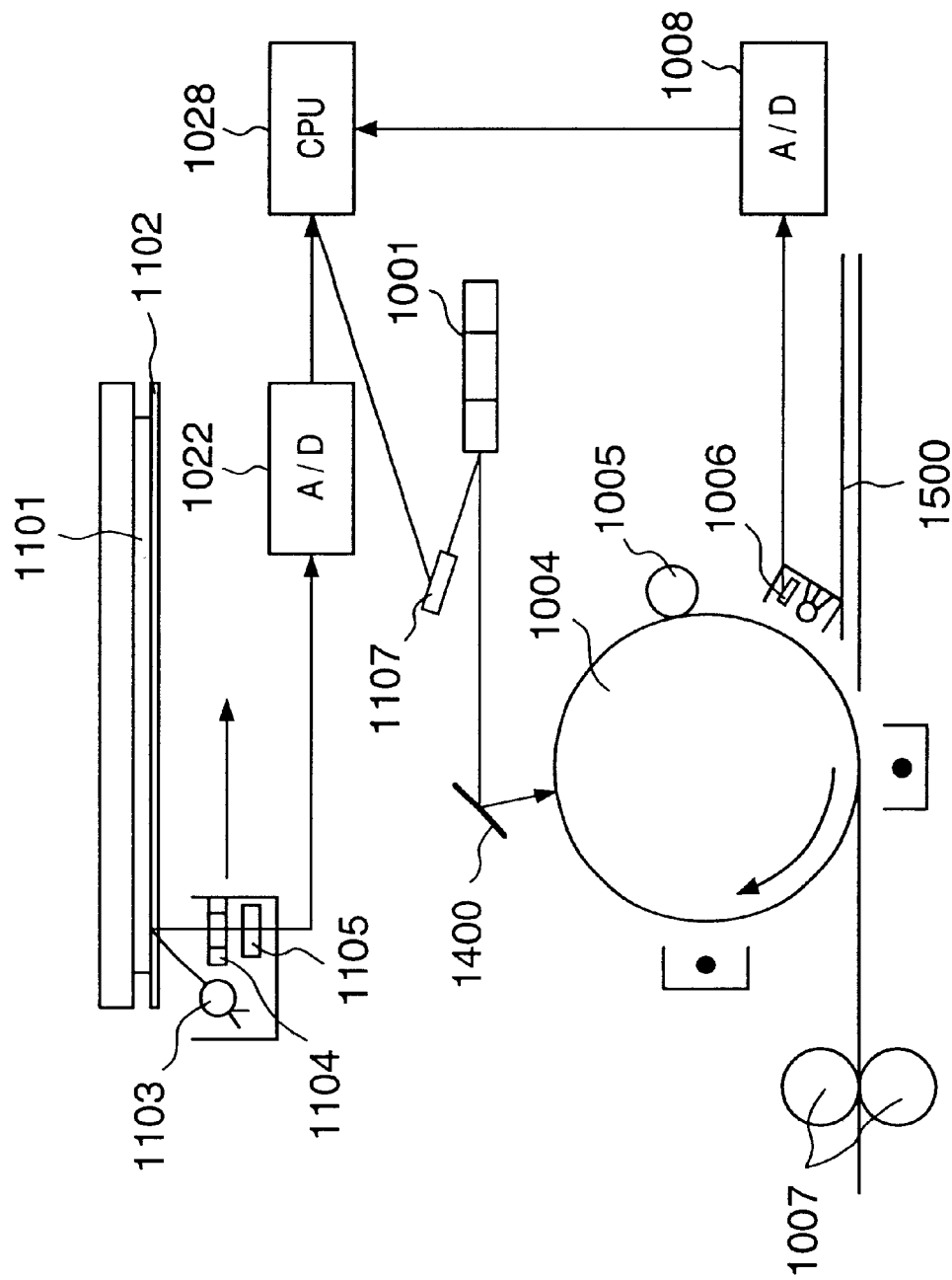
FIG. 15 is a view showing the schematic arrangement of a monochromatic digital copying machine to which the third embodiment of the present invention is applied.

FIG. 15 shows the schematic arrangement of the monochromatic digital copying machine according to the third embodiment. The basic arrangement of the monochromatic digital copying machine of the third embodiment is the same as that of the color copying machine of the above-described first embodiment. As the characteristic feature of the monochromatic copying machine, no multiple transfer is required because of monochromatic copy, and therefore, the copying machine has no transfer drum.

The apparatus arrangement will be briefly described with reference to FIG. 15. When a copy start key (not shown) is pressed, a CPU 1028 starts exposure/scanning of an original 1101 placed on an original glass plate 1102 using an exposure lamp 1103. The image of reflected light from the original 1101, which is obtained by this exposure/scanning, is focused on a CCD 1105 through a lens 1104 and input to an A/D converter 1022.

The A/D converter 1022 decomposes the incident image of reflected light from the original 1101 into a plurality of pixels using a plurality of photoelectric conversion elements and generates photoelectric conversion signals (digital signals) in accordance with the densities of the pixels.

The CPU 1028 drives a pulse width modulator (not shown) in accordance with the input digital signal. A pulse signal having a pulse width corresponding to the level of the input image signal is output. The pulse signal is input to a laser driver 1107 for driving the laser source.

A laser beam E emitted from the semiconductor laser in the laser driver 1107 is swept by a rotary polyhedral mirror 1001 and scans a photosensitive drum 1004 via a mirror 1400 to form an electrostatic latent image. The electrostatic latent image formed on the photosensitive drum 1004 is inverted and developed by a monochromatic developer 1005 to form a visible image (toner image). The toner image is transferred to a printing medium 1500 conveyed by a conveyance means (not shown) and thermally fused by rollers 1007. A sensor 1006 detects the density of a patch formed on the photosensitive drum 1004. The detected value is supplied to the CPU 1028 through an A/D converter 1008.

In the monochromatic digital copying machine having the above arrangement as well, the density of the patch formed on the photosensitive drum 1004 is detected, and the T/C ratio or the contrast potential is controlled on the basis of the patch density, thereby controlling gradation. Hence, exposure amount control in patch formation in accordance with a change in maximum pulse width is realized as in the above-described first or second embodiment.

As described above, according to the third embodiment, in the image forming apparatus for forming a monochromatic image as well, even when the maximum pulse width Pff for image formation is changed, the maximum pulse width Pff for patch formation is not changed, or the laser level is controlled, as in the first or second embodiment, thereby forming a patch on the basis of the same exposure amount as that before the change in the maximum pulse width Pff. Hence, gradation can be accurately corrected on the basis of the measured density of the patch.

Other Embodiments

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a storage medium storing software program codes for realizing the functions of the above-described embodiments to a system or an apparatus, and causing the computer (or a CPU or an MPU) of the system or the apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, a hard disk, an optical disk, a magnetooptical disk, a CD-ROM, a CD-R, a magnetic tape, a nonvolatile memory card, a ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes. When the present invention is applied to the storage medium, the storage medium stores program codes corresponding to the above-described flow chart.

As has been described above, according to the present invention, when an image is to be formed by pulse width modulation, stable gradation characteristics can be maintained even when the maximum pulse width is changed.

As many apparently widely different embodiments of the present invention can be made without departing from the spirit and scope thereof, it is to be understood that the invention is not limited to the specific embodiments thereof except as defined in the appended claims.

What is claimed is:

1. An image forming apparatus comprising:
    modulation means for pulse-width-modulating image signals and outputting pulse-width-modulated signals;
    image forming means for forming an image on an image carrier on the basis of the pulse-width-modulated signals;
    setting means for setting a pulse width of the pulse-width-modulated signal to an arbitrary value corresponding to a maximum density of an image to be formed by said image forming means so as to change the maximum density;
    measurement means for measuring density of the image formed on the image carrier;
    correction means for controlling said image forming means to form a predetermined pattern image on the image carrier on the basis of pulse-width-modulated signals representing the pattern image, and correcting an image formation condition of said image forming means on the basis of a density of the pattern image measured by said measurement means; and
    control means for determining the pulse width set by said setting means as the pulse width of the pulse-width-modulated signal corresponding to the maximum density when performing normal image formation, and determining a fixed pulse width as the pulse width of the pulse-width-modulated signal corresponding to the maximum density regardless of the pulse width set by said setting means when forming the pattern image,
    wherein said correction means corrects said image formation condition so that the density measured by said measurement means has a fixed value regardless of the pulse-width set by said setting means.

2. The image forming apparatus according to claim 1, wherein said image forming means comprises developing means for forming a visual image on the image carrier using toner, and said correction means corrects density of the toner in said developing means.

3. The image forming apparatus according to claim 1, wherein said image forming means comprises charging means for charging the image carrier, and said correction means corrects a difference between maximum and minimum potentials to be applied to the image carrier.

4. The image forming apparatus according to claim 1, wherein said setting means sets the pulse width corresponding to the maximum density with a range between 50–100% of maximum pulse width which said modulation means can output.

5. A control method of controlling an image forming apparatus having modulation means for pulse-width-modulating image signals and outputting a pulse-width-modulated signals, image forming means for forming an image on an image carrier on the basis of the pulse-width-modulated signals, measurement means for measuring density of the image formed on the image carrier, and correction means for controlling said image forming means to form a predetermined pattern image on the image carrier on the basis of pulse-width-modulated signals representing the pattern image, and correcting an image formation condition of said image forming means on the basis of a density of the pattern image measured by said measurement means, said method comprising the steps of:
    setting a pulse width of the pulse-width-modulated signal to an arbitrary value corresponding to a maximum density of an image so as to change the maximum density which can be reproduced by said image forming means;
    determining the pulse width set in said setting step as the pulse width of the pulse-width-modulated signal corresponding to the maximum density when performing normal image formation; and
    determining a fixed pulse width as the pulse width of the pulse-width-modulated signal corresponding to the maximum density regardless of the pulse width set in said setting step when forming the pattern image,
    wherein said correction means corrects said image formation condition so that the density measured by said measurement means has a fixed value regardless of the pulse-width set by said setting step.

6. The control method according to claim 5, wherein, in said setting step, the pulse width corresponding to the maximum density is determined within a range between 50–100% of maximum pulse width which said modulation means can output.

7. An image forming apparatus comprising:
    modulation means for pulse-width-modulating image signals and outputting pulse-width-modulated signals;
    exposure means for exposing a photosensitive member on the basis of the pulse-width-modulated signals;
    developing means for developing a latent image formed by said exposure means with toner;
    measurement means for measuring a density of an image-for-measurement formed on the photosensitive member;
    toner density adjustment means for adjusting density of the toner in said developing means on the basis of the density measured by said measurement means;
    setting means for setting a pulse width of the pulse-width-modulated signal to an arbitrary value corresponding to a maximum density of an image to be developed by said developing means when performing normal image formation so as to change the maximum density; and
    control means for controlling an exposure amount for forming the image-for-measurement to a constant regardless of the pulse width set by said setting means when forming a pattern image, wherein said toner density adjustment means adjusts density of the toner in said developing means so that the density measured by said measurement means has a fixed value regardless of the pulse-width set by said setting means.

8. The image forming apparatus according to claim 7, wherein said control means determines the pulse width set by said setting means as the pulse width of the pulse-width-modulated signal corresponding to the maximum density when performing normal image formation, and determines a fixed pulse width as the pulse width of the pulse-width-modulated signal corresponding to the maximum density regardless of the pulse width set by said setting means when forming the pattern image.

9. A control method of controlling an image forming apparatus having modulation means for pulse-width-modulating image signals and outputting a pulse-width-modulated signals, exposure means for exposing a photosensitive member on the basis of the pulse-width-modulated signals, and developing means for developing a latent image formed by said exposure means with toner, said method comprising the steps of:

setting a pulse width of the pulse-width-modulated signals to an arbitrary value corresponding to a maximum density of an image to be developed by said developing means when performing normal image formation so as to change the maximum density;

forming an image-for-measurement of the photosensitive member using pulse-width-modulated signals representing the image-for-measurement while controlling an exposure amount of said exposure means to constant regardless of the pulse width set in said setting step; and measuring density of the formed image-for-measurement; and adjusting density of the toner in said developing means on the basis of the measured density, wherein said adjusting step adjusts density of the toner in said developing means so that the density measured by said measuring step has a fixed value regardless of the pulse-width set by said setting step.

10. The control method according to claim 9, wherein, in said forming step, a fixed pulse width is determined as the pulse width of the pulse-width-modulated signal corresponding to the maximum density regardless of the pulse width set in said setting step.

* * * * *